March 16, 1954     J. A. RITCH, JR     2,672,597
INDICATOR FOR VEHICLE WHEELS
Filed Oct. 10, 1952     2 Sheets-Sheet 1
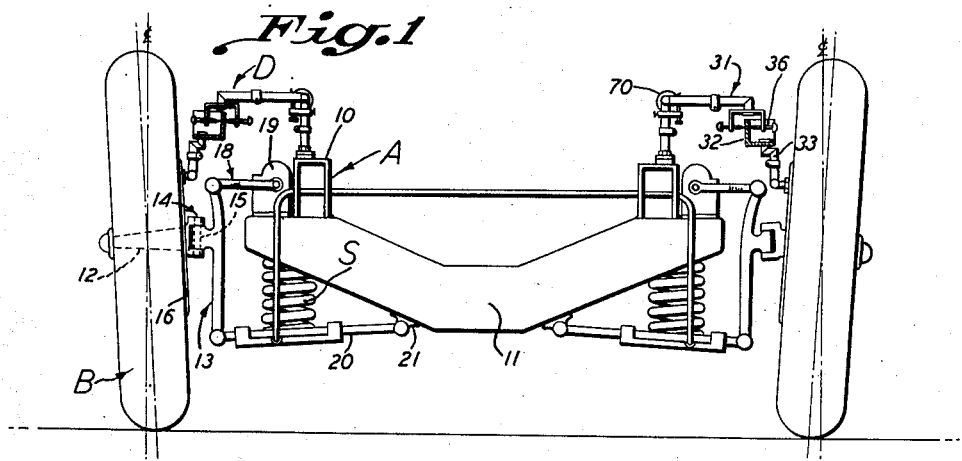
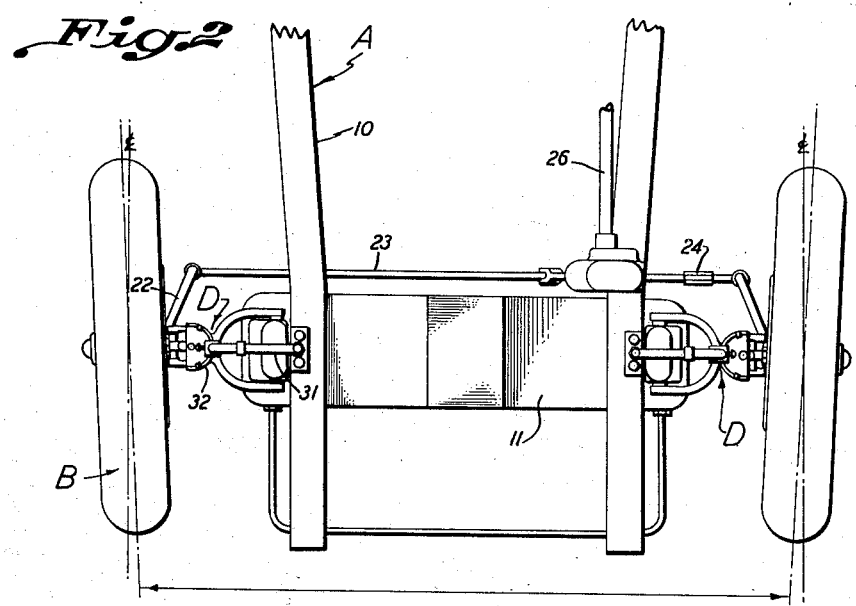
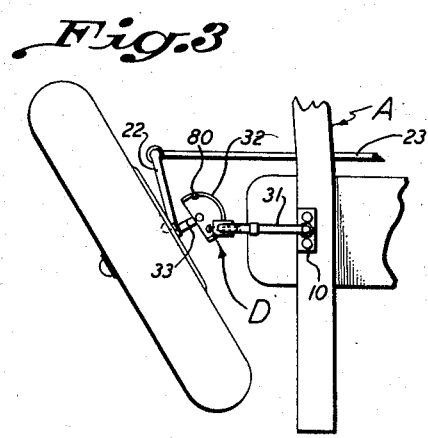
INVENTOR.
JULIAN A. RITCH Jr.
BY
Attorney.

March 16, 1954  J. A. RITCH, JR  2,672,597
INDICATOR FOR VEHICLE WHEELS
Filed Oct. 10, 1952  2 Sheets-Sheet 2
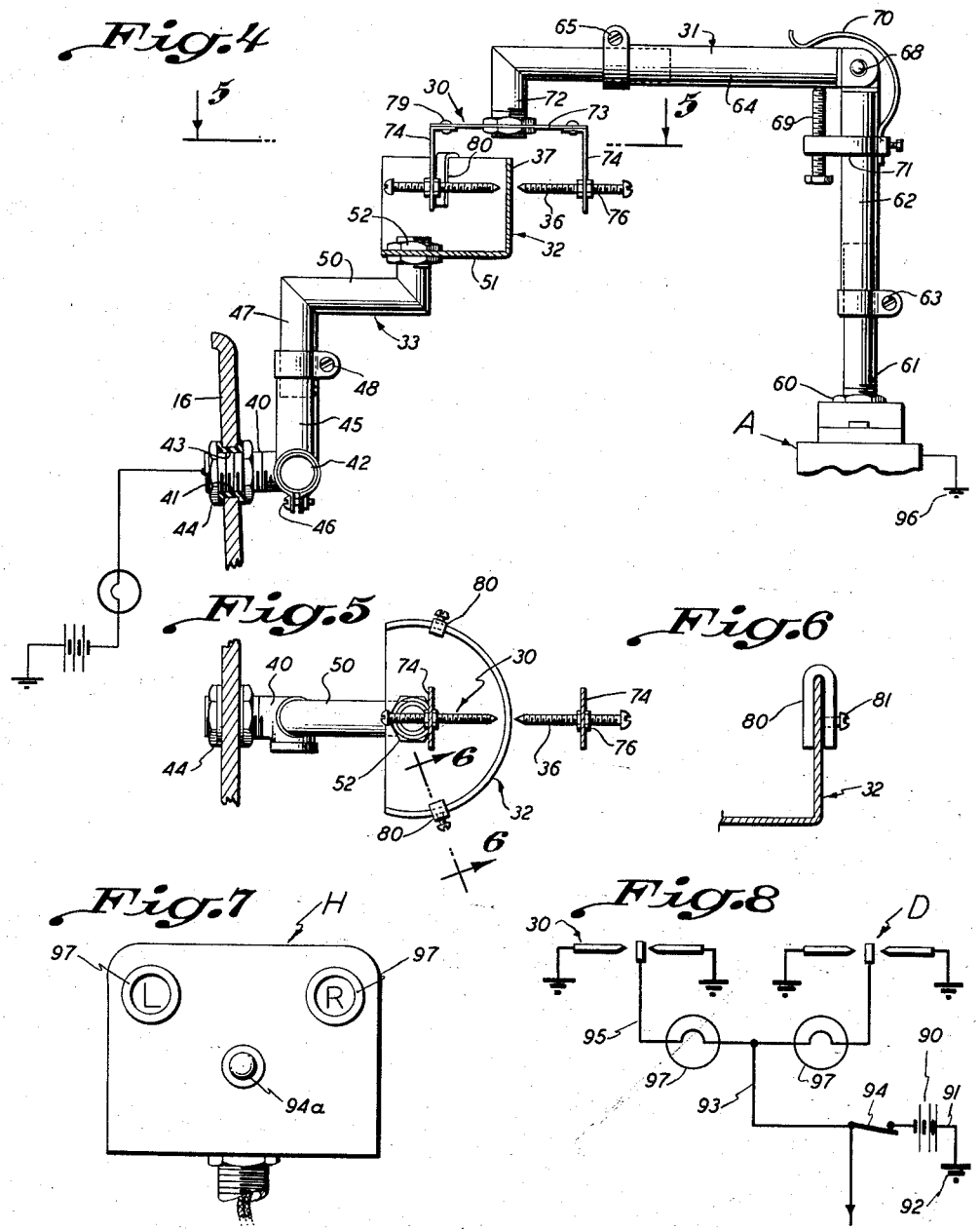
INVENTOR.
JULIAN A. RITCH Jr.
BY
Attorney.

Patented Mar. 16, 1954

2,672,597

UNITED STATES PATENT OFFICE 2,672,597

INDICATOR FOR VEHICLE WHEELS

Julian A. Ritch, Jr., Banning, Calif.

Application October 10, 1952, Serial No. 314,036

14 Claims. (Cl. 340—52)

This invention is concerned with an indicator for vehicle wheels and it is the general object of the invention to provide a simple, practical, accurate indicator serving to indicate to the operator of a motor vehicle the condition or set of the front wheels of the vehicle, particularly as to camber and toe-in.

If the front wheels of a vehicle, such as an automobile, are to operate properly or most advantageously, certain adjustments or settings are necessary and the most important of these are known as camber and toe-in. Most vehicles have wheel mountings or include construction that provides for effecting adjustment of the front or steering wheels as to camber and toe-in. Further, as vehicles are manufactured it is common to accurately set or adjust the front wheel mountings so that the front wheels are established with the desired camber and with the proper degree of toe-in. As the ordinary vehicle is operated and as wear occurs in the working parts the adjustment or set of the front wheels varies and it is not uncommon for the wheels to get out of adjustment as to camber or toe-in or both. Improper wheel adjustments may result in excessive or improper wear of tires and will, in many instances impair free or convenient steering of the vehicle.

It is a general object of this invention to provide a construction applicable to an ordinary vehicle such as the ordinary automobile and which is such as to indicate to the operator of the vehicle a variance of wheel camber from a setting that is desired and which is such that the operator can whenever he wishes easily and quickly check as to the toe-in of the wheels.

It is another object of this invention to provide a structure of the general character referred to which is simple, both in construction and as to its application to a typical or conventional vehicle. The structure as provided by the present invention provides or involves but few simple parts and these parts are such that they can be easily and quickly applied to a motor vehicle without rebuilding or without materially complicating the vehicle construction as by interfering with other parts employed or required in the vehicle.

It is a further object of this invention to provide a device or construction of the general character referred to which is such that it can be easily and quickly applied to a typical motor vehicle and which is characterized by features of construction which make for adjustment so that the working parts of the structure can be easily and quickly positioned to operate in the desired manner.

It is a further object of this invention to provide a structure of the general character referred to which is of practical and simple construction, the mechanism as provided by the invention being free of intricate or delicate parts likely to fail or likely to become injured in the course of normal operation of the vehicle.

The structure of the present invention is adapted to be applied to a typical motor vehicle and it includes, generally, a contact means characterized by what may be termed a stationary contact and a movable contact. In a typical application a mounting means carries or supports the stationary contact from a fixed or stationary part of the vehicle such as the frame. A mounting means supports the movable contact from a movable part such as the cover or brake plate which is related to the wheel, the adjustments of which are to be indicated. In a typical application of the invention the movable contact is arcuate in form and its mounting supports it so that its central axis or its center of curvature is concentric with the king pin of the wheel. The stationary contact is characterized by opposed contact members at opposite sides of the arcuate contact and set or supported so that, under normal operating conditions they remain clear of the arcuate contact. The setting of the parts is such that should the camber adjustment of the wheel vary appreciably contact is made and the circuit provided through the contact means is energized and if desired a signal can be energized. Stop contacts are combined with or related to the arcuate movable contact and are adapted to be adjusted so that they are normally just out of reach of the contacts of the stationary contact unit when the wheels of the vehicle are turned to extreme positions. As a result of this, if the toe-in condition or setting of the wheels gets out of adjustment, the turning of the wheels to an extreme position will result in engagement of one or the other of the stop contacts with resulting energization of the signal circuit.

The various objects and features of my invention will be fully understood from the following detailed description of a typical preferred form and application of the invention, throughout which description reference is made to the accompanying drawings, in which:

Fig. 1 is a front elevation of parts of a typical motor vehicle and particularly of parts such as the present invention may be combined with showing the front or steering wheels of the vehicle indicated as set with a substantial amount of camber to illustrate this factor of adjustment. Fig. 2 is a plan view of the structure as shown in Fig. 1 showing the wheels set with a substantial amount of toe-in to indicate this factor. Fig. 3 is a view similar to a portion of Fig. 2 illustrating one of the wheels turned to an extreme position in one direction. Fig. 4 is an enlarged view of a portion of the structure illustrated in Fig. 1, being a view illustrating in detail the construction provided by the present invention and showing it as applied to parts of the motor vehicle. Fig. 5 is a plan section taking as indicated by line 5—5 on Fig. 4. Fig. 6 is an enlarged detailed, sectional view taken as indicated by line 6—6 on Fig. 5. Fig. 7 is a face view of an instrument that may be included in the structure as provided by the invention and Fig. 8 is a rather simple diagrammatic view illustrating a circuit that may be employed in carrying out the invention.

The structure provided by the present invention is applicable to various vehicles and is adapted to be applied to the front or steering wheels of the vehicle. The invention is particularly practical as applied to the front or steering wheels of the ordinary motor vehicle or automobile and, therefore, in the accompanying drawings this type of vehicle is illustrated and the parts illustrated have been limited to those portions of a typical automobile with which the structure of the present invention is related.

The particular vehicle illustrated in the drawings includes generally, a frame A and in accordance with conventional construction this frame has longitudinal beams or side members 10 and the forward end portions of the side members 10 are joined by a transverse spreader or web 11. The vehicle has front wheels B forming a pair of wheels, and each wheel is carried by a spindle 12 supported from a knuckle support 13 through a suitable knuckle joint 14. The knuckle joint is characterized by a pivot member or king pin 15 and the spindle carrying portion of the knuckle joint is provided with a brake or cover plate 16 which is located at the inner side of the wheel and which does not turn with the wheel about the spindle but rather is, in effect, stationary except that it moves or turns about the axis of the king pin 15 as the knuckle joint operates to turn the wheel in either direction from a straight ahead position. The knuckle support 13 is connected to the frame A and in accordance with typical construction the mounting of the knuckle support 13 includes an upper yoke or wishbone 18 which carries the upper end of support 13 and which is connected to the frame A through a shock absorber 19. A lower yoke or wishbone 20 carries the lower end of support 13 and is connected to the frame A through a suitable mounting bracket 21. A spring S is arranged between the wishbone 20 and a part of the frame. The construction just described is typical of conventional construction and it is to be understood that this construction provides a suitable support for the king pin 15 and that by suitable adjustment of the construction, as by varying of shims or the like, the camber or pitch of the king pin can be varied or adjusted as circumstances require.

In accordance with conventional construction, steering arms 22 project from the elements of the knuckle joints that carry the spindles 12 and a tie rod 23 connects the arms 22. In practice an adjustable coupling 24, or the like, is included in, or provided in connection with, the tie rod 23 so that the length of the rod 23 can be varied with consequent variance as to the toe-in of the wheels B. A usual or conventional steering gear 26 is provided and in accordance with conventional construction is supported by the frame A and connects with the tie rod 23 to effect lateral shifting of the tie rod and consequent turning of the wheels B about the axes of the king pin 15.

The conventional motor vehicle construction as set forth above provides for support of the forward end portion of the vehicle frame by means of the front wheels B and it provides for adjustment or variance of camber of the wheels as well as for variance or adjustment as to the toe-in of the wheels.

The present invention provides a structure to be applied to be or combined with motor vehicle parts such as those above mentioned and it includes a signal system or circuit which when actuated indicates to the operator of the vehicle conditions of adjustment of the wheels B, that is, adjustment as to the camber of the wheels or as to the toe-in of the wheels or both.

The structure as provided by the present invention may be applied to either one or both of the front wheels of the vehicle. Ordinarily it is preferred that the invention be applied to both front wheels of the vehicle and it is thus illustrated in the drawings. The structure related to each wheel is the same and, therefore, in the following description reference will be made to a construction as applied to one wheel, it being understood that this description is applicable to both wheels of the vehicle.

The present invention provides, generally, a signal circuit to be applied to or incorporated in a motor vehicle and it provides a contact means D in the signal circuit and, as above pointed out, there is a contact means D related to each wheel at the front end of the vehicle.

Each contact means D as provided by the present invention includes, generally, a contact unit 30 which will be referred to as a stationary contact unit, a mounting means 31 for contact unit 30, a movable or shiftable contact unit 32 and a mounting 33 for the contact unit 32. Considered generally, the stationary contact unit 30 is mounted or supported so that it is normally stationary relative to the frame A of the vehicle and it is characterized by a U-shaped holder carrying opposed contact members 36. The movable contact 33 is mounted to move or shift with the element of the knuckle joint 14 which carries the spindle 12 and in practice is supported from the plate 16 through the mounting 33 as will be hereinafter described. The contact unit 33 is characterized by a curved or arcuate contact plate 37 and the mounting 33 supports that plate so that its axis is coincidental with that of the king pin of the wheel.

The mounting 33 for the movable contact unit 32 may vary in form and construction, depending upon conditions encountered, as for instance the form and construction of parts employed in a motor vehicle. In an ordinary situation, however, the mounting 33 may include a base applied to, or fixed on, the plate 16 and it may have a stem carried by the base and provided with a head supporting the contact unit 32. In the particular case illustrated the base of the mounting 33 has a substantialy horizontal arm 40 that extends through an opening 41 provided in plate 60 and it has a substantially horizontal arm 42 which extends in a direction normal to that of the arm 41. For the purpose of carrying out or accommodating the particular circuit that is to be referred to, the arm 40 is insulated from the plate 16 as by means of an electrical insulator 43 and in the particular case illustrated clamp nuts 44 serve to secure the arm 40 to the plate 14.

The stem of mounting 33 has a lower section 45 pivotally supported by the arm 42 and adapted to be made tight or fixed thereon as by means of a clamp actuated by a screw 46. A second, or upper, section 47 of the stem is telescopically related to section 45 of the stem and is adapted to be moved to various positions relative thereto. In the case illustrated, a suitable clamp actuated by a screw 48 serves to make the sections 45 and 47 of the stem secure against relative movement. In the preferred or normal arrangement of parts, the stem just described projects vertically, or substantially so, and upwardly from the point where the structure is secured to the plate 16. A head 50 on the upper end of stem section 47 is substantially horizontally disposed and projects transversely of the vehicle or inwardly. The head 50 is provided as the carrier or support for the contact unit 32 and in the case illustrated it is shown attached to a mounting flange portion 51 of the contact unit, to which part it is secured by clamp nuts 52.

Through the construction just described it will be apparent that the mounting 33 serves to support the contact unit 32 at various positions vertically and it will be apparent that it can be adjusted so that the arcuate contact plate 37 of unit 32 may be set or located with its axis incidental with that of the king pin of the knuckle supporting the wheel.

The mounting 31 provided to support the contact unit 30 is shown as including a fastener 60 adapted to be secured to a suitable part of frame A and a stem projects upwardly from the fastener 60 and supports an arm that extends substantially horizontally and which is such as to carry the contact unit 30.

The stem carried by fastener 60 is shown joined to the fastener by a threaded connection and it is shown as having a lower section 61 fixed to the fastener and projecting upward therefrom. An upper section 62 of the stem is telescopically related to the lower section and is adapted to be fixed or set relative thereto by a suitable fastener including a clamp screw 63.

The arm 64 of mounting 31 is carried by the upper end portion of section 62 and normally projects substantially horizontal therefrom. In an arrangement such as is illustrated in the drawings the arm 64 is substantially horizontal and projects transversely of the vehicle and outwardly from section 62 of the stem. In the particular case illustrated the arm 64 is shown formed of telescopically related sections and a suitable clamp or setting means including a clamp screw 65 is provided for setting the sections of the arm against relative movement.

In carrying out the invention the arm just described may be connected to the upper end of stem section 62 by a horizontal pivot pin 68 and a stop, such as an adjustable screw 69, may be provided to manually position the arm in the desired manner relative to the stem. In the construction illustrated a suitable spring 70 is provided to normally yieldingly urge the arm downwardly. The spring as shown in the drawings may be a leaf spring supported by a bracket 71 carrying the stop screw 69.

A depending head 72 on the outer or terminal end of arm 64 carries the contact unit 30 and in the case illustrated it carries a plate 73 of unit 30 which plate has depending flanges 74, one adapted to be normally located inside the arcuate plate contact 37 while the other is normally at the outside of the arcuate plate contact 37.

The contact members 36 of the contact unit 30 are adjustably carried by the depending flanges 74 and as shown in the drawings they may be made secure in adjusted position as by means of lock nuts 76. In the particular construction illustrated the contact members 36 are shown as screws or are threaded members and the lock nuts 76 are threaded on the contact members and clamp against opposite sides of the flanges 74. In practice the plate 73 and the depending flanges 74 on the plate 73 may be adjustable; for example, the flanges may be joined to the plate by screw fasteners 79 which provide for some adjustment of the flanges relative to the plate. Further, these parts may in practice be of such construction as to be somewhat flexible, so that, should relative movement occur between the contact units causing these parts to engage in an unusual manner, the construction allows for such action and returns to its normal condition uninjured.

From the foregoing description it will be apparent how the mounting 31 may be set or adjusted to locate the contacts 36 at opposite sides of the arcuate contact plate 27 with the tips of the contacts 36 spaced a suitable amount from the plate 37. It will also be noted that the construction is such that should relative movement occur between the contact units as, for instance, movement resulting from unusual compression of the spring S the parts of the contact unit 30 will accommodate such movement and, further, the arm 64 of the mounting 31 may swing up somewhat against the resistance of spring 70, all with the result that there is action of the structure without injury or deformation of parts.

The invention provides stop contacts 80 in connection with the arcuate plate contact 37 and in the case illustrated the contacts 80 are U-shaped members engaged over the upwardly projecting edge portion of plate 37 and are adapted to be set in suitably spaced relation as by means of set screws 81. The stop contacts 80 are circumferentially spaced apart and when the wheels of the vehicle have been set with the desired toe-in the stop contacts are set so that they are just out of reach of the contact members 36 of contact unit 30 when the wheels are turned to extreme positions, that is, to an extreme in position and an extreme out position.

In a typical carrying out of the present invention an instrument panel H may be provided including elements of the circuit provided by the present invention and this instrument may in practice be mounted at the driver's compartment of the vehicle, for instance, at the instrument board of the vehicle.

In a typical circuit, as provided by the invention, there is a source of energy as, for instance, a battery 90 and a line 91 from one side or pole of the battery is grounded as at 92. The other side of the battery circuit is carried by a line 93 in which there may be a control switch 94. In the case illustrated branches 95 of the line 93 extend to the contact unit 32, for instance to the arcuate contact plate 37, this portion of the circuit being maintained electrically insulated. The contact unit 30 with the contact members 36 is preferably connected to ground as, for instance, to the frame A which is connected to ground as at 96. In carrying out the invention, signal elements, such as lamps 97, may be connected in the branches 95 of line 93 and may be located in the instrument H. In the preferred installation, the line 93 is connected to the ignition switch, in which case the structure is energized whenever the vehicle is in operation. It is to be understood, however, that the circuit could be under control of a switch 94a located in the instrument panel H, in which case the circuit could be energized whenever desired.

Assuming the motor vehicle to be constructed with elements such as those hereinabove described, and assuming the wheels B of the vehicle to be adjusted or set to have the desired camber and toe-in the structure as provided by the present invention applied to the frame A and plate 16 can be easily and quickly adjusted. From the foregoing description it will be apparent that the mounting 33 as provided by the present invention can be quickly set or adjusted so that the arcuate contact plate 37 is set relative to plate 16 so that it is at the desired location, that is, is in the proper vertical position and is also located with its axis concentric with that of the king pin 15. In like manner the mounting 31 carrying contact unit 30 can be easily and quickly adjusted so that the contact members 36 are located just out of contact with the sides of plate 37 and are related to the contact 37 in a manner such as illustrated in Fig. 4 of the drawings. Further, it will be apparent that by turning the steering gear to the extreme positions the stop contacts 80 can be readily set just out of range of the contact members 37.

With the structure set as just described the signaling circuit, as provided by the invention, will remain unactuated during the normal course of operation of the vehicle. If desired the switch 94 may be a switch which is normally open and the operator may, from time to time, close switch 94 to check the signal circuit to see that it is open, or if desired the switch 94 may be one that is normally closed so that the operator's attention is attracted by a signal any time that the circuit is closed for any reason whatsoever.

If for any reason the camber of the wheels varies or gets appreciably out of adjustment the arcuate contact 37 will be shifted relative to the contact members 36 and with the contact means D located and constructed as hereinabove described, but slight variation in camber of the wheels will result in one or the other of the contacts 36 being brought into contact with plate 37. With the parts thus contacted the closing of the switch 94 will indicate by means of energizing of a signal lamp that the camber is out of adjustment; or if the switch 94 is normally closed the circuit will indicate by means of energizing of a signal lamp the lack of adjustment of the camber as soon as this condition occurs. To ascertain whether or not toe-in of the wheels is out of adjustment the operator can from time to time turn the wheels to the extreme positions, that is, turn them as far in as they will go and then as far out as they will go. If the toe-in condition is out of adjustment one or the other of the contact members 36 will engage a stop contact 80 and as a result a signal will be given by the energization of a signal lamp.

Having described only a typical preferred form and application of my invention, I do not wish to be limited or restricted to the details herein set forth, but wish to reserve to myself any variations or modifications that may appear to those skilled in the art and fall within the scope of the following claims.

Having described my invention, I claim:

1. A structure applicable to a vehicle having a frame, a member having a wheel carrying spindle, and a king pin mounting said member on the frame including, a contact unit having an arcuate contact plate, means adapted to mount said contact plate from said member and concentric with the pin, a second contact unit with opposed contact members, means adapted to mount said second contact unit from the frame with said contact members facing and normally spaced from opposite sides of the contact plate, and means establishing an alarm circuit adapted to be controlled by said contact units.

2. A structure applicable to a vehicle having a frame, a member having a wheel carrying spindle, and a king pin mounting said member on the frame including, a contact unit having an arcuate contact plate, stop contacts spaced apart longitudinally of the arcuate contact plate, means adapted to mount said contact plate from said member and concentric with the pin, a second contact unit with opposed contact members, means adapted to mount said second contact unit from the frame with said contact members facing and normally spaced from opposite sides of the contact plate, and means establishing an alarm circuit adapted to be controlled by said contact units and the stop contacts.

3. A structure applicable to a vehicle having a frame, a member having a wheel carrying spindle, and a king pin mounting said member on the frame including, a contact unit having an arcuate contact plate, stop contacts spaced apart longitudinally of the arcuate contact plate, means adapted to mount said contact plate from said member and concentric with the pin, a second contact unit with opposed contact members, means adapted to mount said second contact unit from the frame with said contact members facing and normally spaced from opposite sides of the contact plate, and means establishing an alarm circuit adapted to be controlled by said contact units and the stop contacts, each stop contact including an element shiftable along the contact plate and means adapted to set said element in a selected position on the contact plate in the path of one of the contact members.

4. A structure applicable to a vehicle having a frame, a member having a wheel carrying spindle, and a king pin mounting said member on the frame including, a contact unit having an arcuate contact plate, means adapted to mount said contact plate from said member and concentric with the pin including relatively movable elements and means adapted to releasably set said elements against relative movement in selected relation to each other, a second contact unit with opposed contact members, means adapted to mount said second contact unit from the frame with said contact members facing and normally spaced from opposite sides of the contact plate, and means establishing an alarm circuit adapted to be controlled by said contact units.

5. A structure applicable to a vehicle having a frame, a member having a wheel carrying spindle, and a king pin mounting said member on the frame including, a contact unit having an arcuate contact plate, means adapted to mount said contact plate from said member and concentric with the pin including telescopically related elements and means adapted to releasably set said elements against relative movement in selected relation to each other, a second contact unit with opposed contact members, means adapted to mount said second contact unit from the frame with said contact members facing and normally spaced from opposite sides of the contact plate, and means establishing an alarm circuit adapted to be controlled by said contact units.

6. A structure applicable to a vehicle having a frame, a member having a wheel carrying spindle, and a king pin mounting said member on the frame including, a contact unit having an arcuate contact plate, means adapted to mount said contact plates from said member and concentric with the pin including pivotally connected elements and means adapted to releasably set said elements against relative movement in selected relation to each other, a second contact unit with opposed contact members, means adapted to mount said second contact unit from the frame with said contact members facing and normally spaced from opposite sides of the contact plate, and means establishing an alarm circuit adapted to be controlled by said contact units.

7. A structure applicable to a vehicle having a frame, a member having a wheel carrying spindle, and a king pin mounting said member on the frame including, a contact unit having an arcuate contact plate, means adapted to mount said contact plate from said member and concentric with the pin, a second contact unit with opposed contact members, means adapted to mount said second contact unit from the frame with said contact members facing and normally spaced from opposite sides of the contact plate including relatively movable elements and means adapted to releasably set said elements against relative movement in selected relation to each other, and means establishing an alarm circuit adapted to be controlled by said contact units.

8. A structure applicable to a vehicle having a frame, a member having a wheel carrying spindle, and a king pin mounting said member on the frame including, a contact unit having an arcuate contact plate, means adapted to mount said contact plate from said member and concentric with the pin, a second contact unit with opposed contact members, means adapted to mount said second contact unit from the frame with said contact members facing and normally spaced from opposite sides of the contact plate including telescopically related elements and means adapted to releasably set said elements against relative movement in selected relation to each other, and means establishing an alarm circuit adapted to be controlled by said contact units.

9. A structure applicable to a vehicle having a frame, a member having a wheel carrying spindle, and a king pin mounting said member on the frame including, a contact unit having an arcuate contact plate, means adapted to mount said contact plate from said member and concentric with the pin, a second contact unit with opposed contact members, means adapted to mount said second contact unit from the frame with said contact members facing and normally spaced from opposite sides of the contact plate including pivotally connected elements and means adapted to releasably set said elements against relative movement in selected relation to each other, and means establishing an alarm circuit adapted to be controlled by said contact units.

10. A structure applicable to a vehicle having a frame, a member having a wheel carrying spindle, and a king pin mounting said member on the frame including, a contact unit having an arcuate contact plate, means adapted to mount said contact plate from said member and concentric with the pin including relatively movable elements and means adapted to releasably set said elements against relative movement in selected relation to each other, a second contact unit with opposed contact members, means adapted to mount said second contact unit from the frame with said contact members facing and normally spaced from opposite sides of the contact plate including relatively movable members and means adapted to releasably set said members against relative movement in selected relation to each other, and means establishing an alarm circuit adapted to be controlled by said contact units.

11. A structure applicable to a vehicle having a frame, a member having a wheel carrying spindle, and a king pin mounting said member on the frame including, a contact unit having an arcuate contact plate, stop contacts spaced apart longitudinally of the arcuate contact plate, means adapted to mount said contact plate from said member and concentric with the pin including relatively movable elements and means adapted to releasably set said elements against relative movement in selected relation to each other, a second contact unit with opposed contact members, means adapted to mount said second contact unit from the frame with said contact members facing and normally spaced from opposite sides of the contact plate including relatively movable members and means adapted to releasably set said members against relative movement in selected relation to each other, and means establishing an alarm circuit adapted to be controlled by said contact units and the stop contacts.

12. A structure applicable to a vehicle having a frame, a member having a wheel carrying spindle, and a king pin mounting said member on the frame including, a contact unit having an arcuate contact plate, mounting means adapted to mount said contact plate from said member and concentric with the pin, a second contact unit with opposed contact members, mounting means adapted to mount said second contact unit from the frame with said contact members facing and normally spaced from opposite sides of the contact plate, and means establishing an alarm circuit adapted to be controlled by said contact units, one of said mounting means including a pivoted unit carrying arm and means normally yieldingly holding said arm in a predetermined position.

13. A structure applicable to a vehicle having a frame, a member having a wheel carrying spindle, and a king pin mounting said member on the frame including, a contact unit having an arcuate contact plate, means adapted to mount said contact plate from said member and concentric with the pin, a second contact unit with opposed contact members and means supporting the contact members for independent adjustment relative to each other, means adapted to mount said second contact unit from the frame with said contact members facing and normally spaced from opposite sides of the contact plate, and means establishing an alarm circuit adapted to be controlled by said contact units.

14. A structure applicable to a vehicle having a frame, a member having a cover plate and a wheel carrying spindle, and a king pin mounting said member on the frame including, a contact unit having an arcuate contact plate, means adapted to mount said contact plate from said cover plate and concentric with the pin, a second contact unit with opposed contact members, means adapted to mount said second contact unit from the frame with said contact members facing and normally spaced from opposite sides of the contact plate, and means establishing an alarm circuit adapted to be controlled by said contact units.

JULIAN A. RITCH, JR.

References Cited in the file of this patent

UNITED STATES PATENTS

| Number | Name | Date |
|---|---|---|
| 1,096,571 | Stamm | May 12, 1914 |
| 1,954,938 | Lozonne | Apr. 17, 1934 |
| 2,332,690 | Bennett | Oct. 26, 1943 |
| 2,334,991 | Castiglia | Nov. 23, 1943 |